United States Patent
Camp, Jr. et al.

[15] 3,661,551
[45] May 9, 1972

[54] PROCESS FOR PRODUCING HIGH ANALYSIS AMMONIUM POLYPHOSPHATES

[72] Inventors: Ernest C. Camp, Jr., College Park, Ga.; Herbert J. Clausen, Apollo Beach, Fla.

[73] Assignee: Cities Service Company, New York, N.Y.

[22] Filed: May 4, 1970

[21] Appl. No.: 37,359

Related U.S. Application Data

[63] Continuation of Ser. No. 634,191, Apr. 27, 1967, abandoned.

[52] U.S. Cl. ....................................... 71/34, 23/107, 71/43
[51] Int. Cl. ..................................... C05b 13/06, C05b 1/06
[58] Field of Search ................................. 71/34, 36, 43, 64 C

[56] References Cited

UNITED STATES PATENTS

| | | | |
|---|---|---|---|
| 2,950,961 | 8/1960 | Striplin et al. | 71/51 X |
| 3,192,013 | 6/1965 | Young | 71/43 X |
| 3,228,752 | 1/1966 | Hignett et al. | 71/34 X |
| 3,313,614 | 4/1967 | Sharples et al. | 71/34 |
| 3,375,063 | 3/1968 | Bookey et al. | 71/34 X |
| 3,508,865 | 4/1970 | Farr et al. | 71/34 X |

Primary Examiner—Reuben Friedman
Assistant Examiner—Bennett H. Levenson
Attorney—William G. Pulliam

[57] ABSTRACT

A method of preparing solid ammonium polyphosphate fertilizers from superphosphoric acid containing non-orthophosphates by diluting the superphosphoric acid at a temperature and rate to inhibit the hydrolysis of the polyphosphates to orthophosphates, and then promptly ammoniating the diluted superphosphoric acid in a reactor at a controlled rate, while maintaining the reactor bed temperature at below 185° F., so that the exothermic heat of neutralization is removed by the heat required for the evaporation of the water and obtaining a solid product.

4 Claims, 5 Drawing Figures

CONSTANT TIME (1 HOUR)

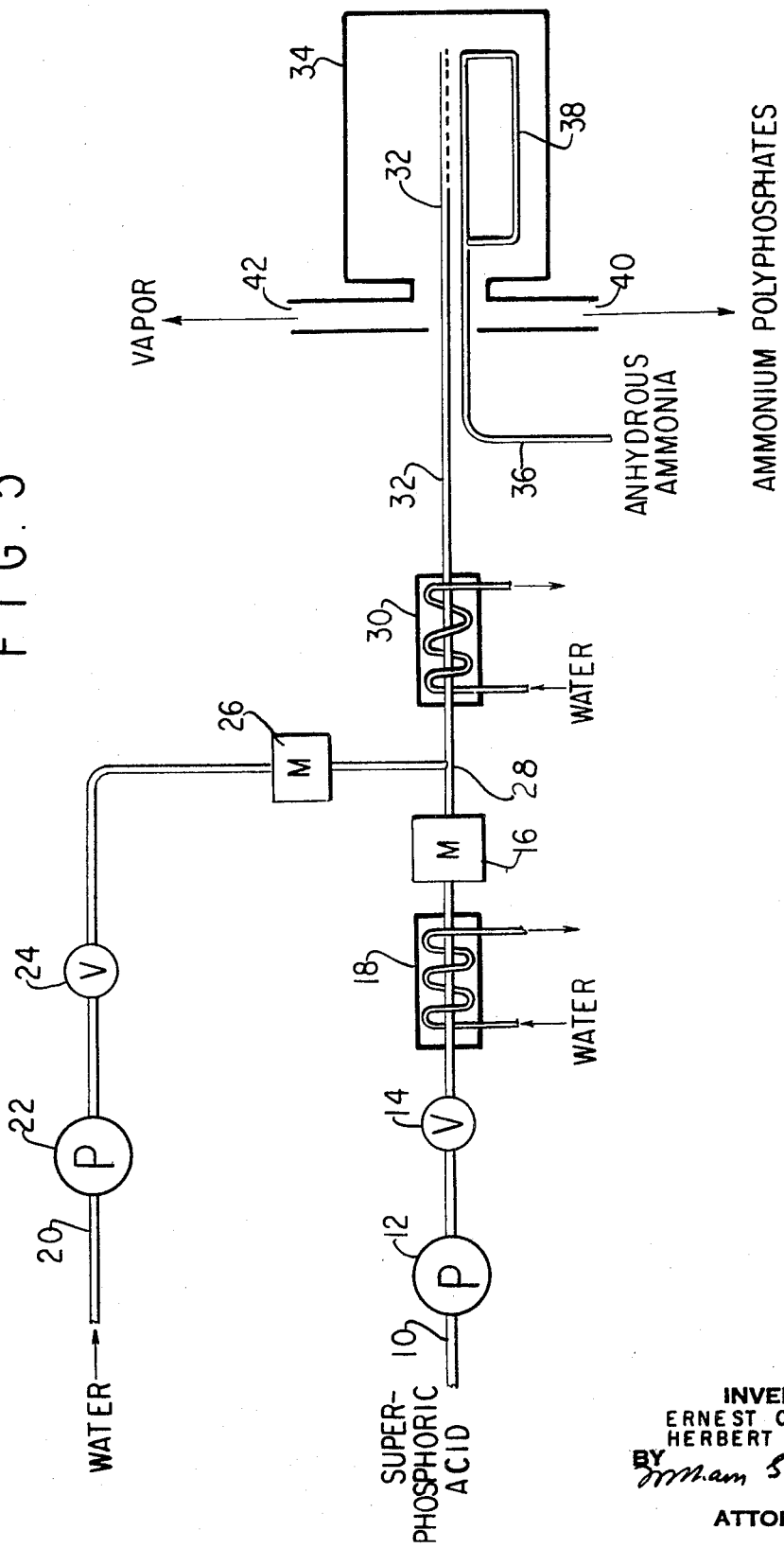

PROCESS FOR PRODUCING HIGH ANALYSIS AMMONIUM POLYPHOSPHATES

This application is a continuation of application Ser. No. 634,191, filed Apr. 27, 1967, now abandoned.

BACKGROUND OF THE INVENTION

This invention relates to a process for producing ammonium polyphosphate solid fertilizers from superphosphoric acid by reacting anhydrous ammonia and diluted phosphoric acid.

"Wet process" phosphoric acid is manufactured by treating phosphate rock with sulfuric acid in order to form free phosphoric acid and calcium sulfate. The latter, being insoluble is separated from the acid by filtration. The wet process acid as commonly produced and handled is highly corrosive to mild steel at ambient temperatures and corrosive to most materials including stainless steels at elevated temperatures. As a result, precautions are necessary in shipping, such as using rubber or polyethylene lined containers and storing it in lead brick or rubber lined vessels. When such wet process acid is treated with ammonia to form aqueous ammonium phosphate solutions, the impurities present in the acid form gelatinous precipitates which are substantially impossible to separate from the aqueous phase by filtration or other conventional methods. Such precipitated impurities in no way interfere with the fertilizing value of the ammonium phosphate, though they settle in the bottom of storage vessels and clog pipe lines and the equipment used for applying the fertilizer to the soil.

Previous attempts to obtain aqueous solutions of ammonium phosphate from wet process phosphoric acid have generally been directed to the purification of the acid. These methods have not been widely accepted because they are complex and costly to perform. They also reduce the nutrient value of the product, since the precipitated impurities themselves are plant nutrients. Therefore, because of the aforesaid problems and disadvantages, substantially all the ammonium phosphate produced from wet process phosphoric acid is applied to the soil as fertilizer in solid form. When polyphosphates are used, these impurities do not precipitate and a substantially clear liquid fertilizer can be produced. It is therefore commercially advantageous to market the ammonium phosphate fertilizer in the polyphosphate form. Recent solutions to these problems in the production of high-analysis ammonium polyphosphate fertilizers are disclosed by U.S. Pat. No. 3,171,733, issued Mar. 2, 1965 and U.S. Pat. No. 3,228,752 issued Jan. 11, 1966 (to Hignett et al.). They disclose a method of directly reacting anhydrous ammonia with concentrated phosphoric acid at elevated temperatures and pressures. The temperature range and the pressure range of the aforesaid processes, range from about 325° F. to about 475° F. with a pressure in the range from about 10 p.s.i.g. to about 1,000 p.s.i.g. therefore requiring the use of a reactor vessel and materials able to withstand such temperatures and pressures. This process therefore becomes very costly when reduced to practice in a commercial manner.

SUMMARY OF THE INVENTION

We have found that by diluting the superphosphoric acid containing non-orthophosphates (polyphosphates), and then ammoniating the diluted superphosphoric acid at a predetermined rate and at a temperature below about 210° F., preferably about 180° F., the heat provided by the heat of neutralization of the ammoniation process will provide sufficient heat for evaporation so as to remove a major amount of the water, thereby obtaining a solid high-analysis ammonium polyphosphate fertilizer material. In order to prevent the hydrolysis of the superphosphoric acid to the orthophosphoric acid during dilution, the concentrated superphosphoric acid is diluted just prior to the ammoniation at a temperature and rate so as to inhibit that hydrolysis.

It is therefore an object of this invention to provide a process for the production of high-analysis ammonium polyphosphate fertilizers requiring low temperatures and ambient pressure.

It is another object of this invention to provide a process for the production of high-analysis solid ammonium polyphosphates which obviates the necessity of the introduction of heat for the evaporation of water.

It is still another object of this invention to provide a process for the production of high-analysis ammonium polyphosphates from superphosphoric acid which inhibits the formation of orthophosphates.

Other objects and advantages of the process of this invention for the production of solid ammonium polyphosphate fertilizers will be apparent from the following summary of the invention, drawings, and description of the preferred embodiments of this invention.

BRIEF DESCRIPTION OF THE DRAWINGS

For further understanding description of the process and apparatus of this invention reference should be had to the following drawings wherein:

FIG. 5 is a flow diagram of the apparatus and the process of this invention for diluting and ammoniating the superphosphoric acid.

DESCRIPTION OF THE PREFERRED EMBODIMENTS

Figure 1:
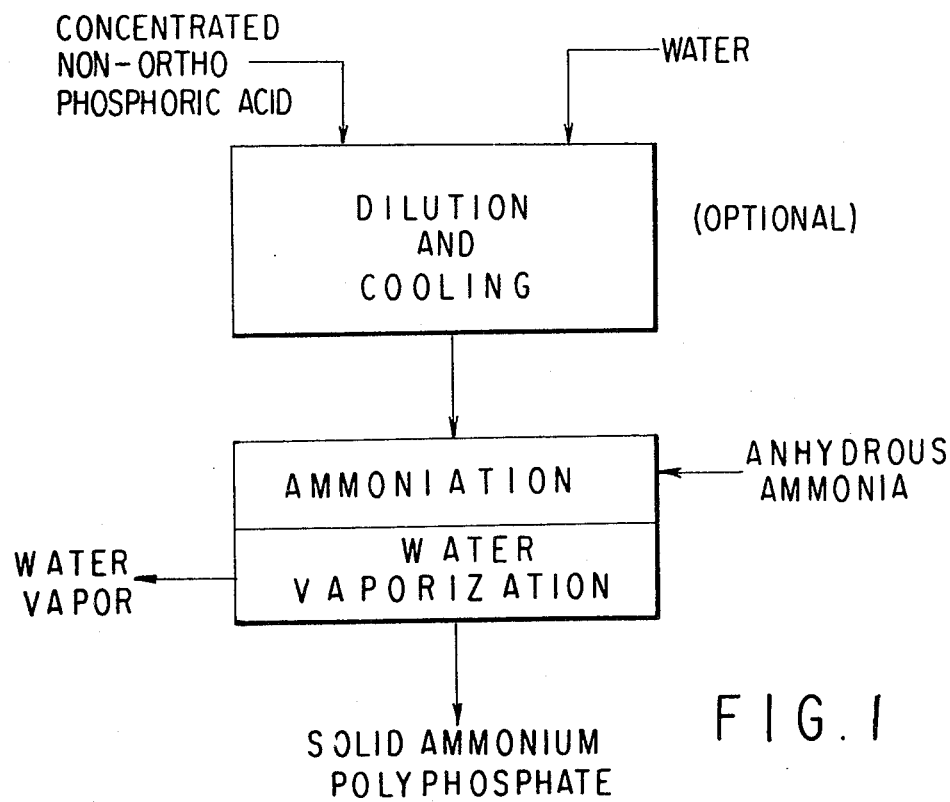
FIG. 1 is a block diagram of the process of this invention for producing high-analysis ammonium polyphosphates.

With reference to FIG. 1 wherein the process of this invention is shown in a flow diagram the starting material is concentrated superphosphoric acid having a 60 to 85 percent by weight phosphorus content expressed as $P_2O_5$. The superphosphoric acid is obtained either by the "Wet process" where phosphate rock is reacted with sulfuric acid, or from Furnace acid.

The term superphosphoric acid as applied in this specification is used to define a phosphoric acid containing substantial quantities of polyphosphoric and ortho-phosphoric acid. The polyphosphoric acids include pyrophosphoric acid, and the various polymeric acids varying from triphosphoric acids to metaphosphoric acid and higher polyphosphates. In the practice of this invention, it is desired that the concentrated superphosphoric acid contain as little orthophosphoric acid as possible in order to obtain a large yield of ammonium polyphosphates.

To provide sufficient water so that the heat involved during the ammoniation process is removed by the heat required for the evaporation of the water, the superphosphoric acid is diluted prior to ammoniation.

However, superphosphoric acid in water tends to hydrolize to the ortho form and therefore it is necessary to provide a method of preventing or inhibiting the aforesaid hydrolysis and consequent formation of the orthophosphates. To this end, the superphosphoric acid is diluted with water just prior to ammoniation and under conditions of rate and temperature to inhibit the hydrolysis of the polyphosphate.

Figure 2:
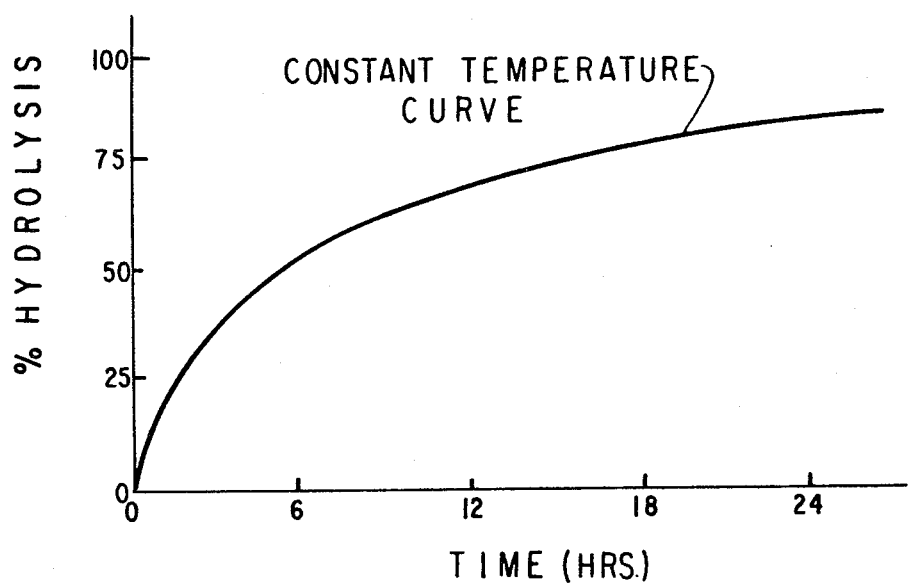
FIG. 2 is a graph showing the percent conversion of superphosphoric acid to orthophosphoric acid at a constant temperature with varying time.
Figure 3:
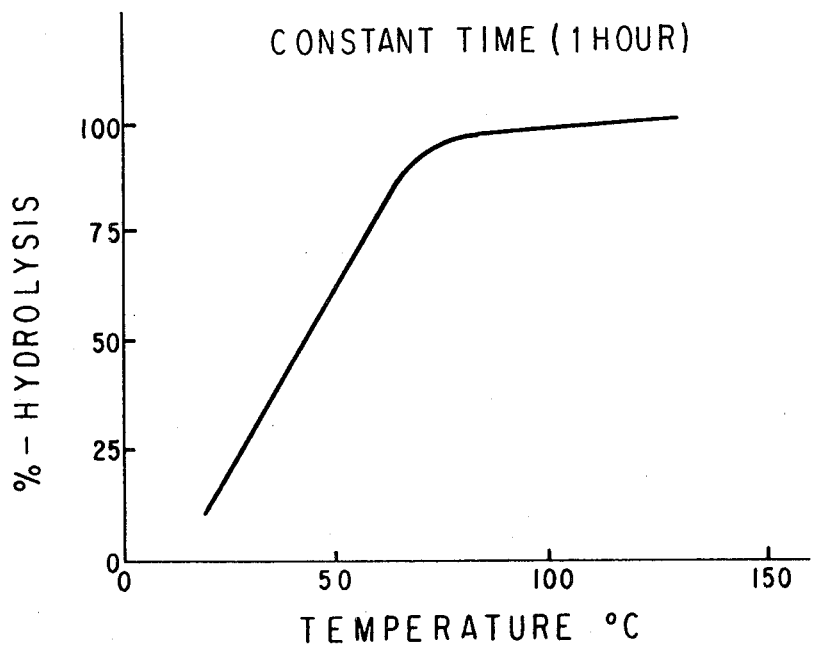
FIG. 3 is a graphical presentation of the percent conversion of superphosphoric acid to orthophosphoric acid wherein the effect of varying temperature is shown.

We have found that by controlling the rate and temperature of the dilution step the hydrolysis and conversion of the polyphosphoric acid to the orthophosphoric acid can be inhibited. The graph of FIG. 2 is indicative of the relatively rapid rate of hydrolysis at room temperature of the polyphosphoric acid. To this end it is therefore desirable to limit the amount of time after dilution and before ammoniation of the superphosphoric acid, and to maintain the temperature at a relatively low level. FIG. 3 is a graphical presentation of the quantitative amount of hydrolysis of the polyphosphoric acid to ortho-phosphoric acid at a constant rate with varying temperatures. It is apparent from the graph of FIG. 3 that it is desirable to maintain the temperature of dilution below 25° C. in order to minimize formation of ortho-phosphoric acid, through control of acid temperature. However, even for a concentrated feed acid temperature of up to 135° F. (57.2° C.), no excessive hydrolytic degradation of the non-ortho phosphoric acid occurred provided the time period between dilution and ammoniation was at, or below 3 minutes. Therefore, for purposes of this invention, we have found that the conditions of time and temperature for dilution of the concentrated superphosphoric acid may range from less than 3 minutes at 135° F. (57.2° C.) to over an hour at temperatures below 77° F. (25° C.) (However, it is preferred to maintain the rate of dilution at a minimum, so as to minimize the formation of ortho-phosphoric acid).

We have found that the suitable range of dilution for the concentrated superphosphoric acid resulting in a diluted superphosphoric acid in the process according to this invention is in the range of from about 49 percent to about 60 percent (defined as $P_2O_5$ by weight) superphosphoric acid. It also has been found that undiluted superphosphoric acid having a concentration (expressed as percent by weight $P_2O_5$) from about 60 percent to about 80 percent may be used without dilution in the practice of this invention. However, it is preferred to obtain a diluted superphosphoric acid having a phosphoric acid concentration of from about 52 to 56 percent by weight expressed as phosphorus pentoxide ($P_2O_5$).

The process is carried out utilizing apparatus, as diagramed in FIG. 5 where concentrated superphosphoric acid is fed to pipe 10 from a supply not shown and is continuously metered utilizing a pump 12 and a valve 14 to obtain the desired flow rate as measured by flow meter 16. The superphosphoric acid is pumped through a heat exchange 18 where the temperature of the acid is stabilized at a predetermined temperature prior to dilution. Water is supplied from a source not shown to pipe 20 and is simultaneously continuously metered utilizing a pump 22 and a valve 24 to obtain a desired predetermined flow rate as measured by flowmeter 26. The superphosphoric acid and the water is mixed to the desired diluted concentration from the juncture 28 of the acid feed pipe 10 and the water feed pipe 20 through the heat exchange 30 where the water acid mixture is sufficiently agitated to obtain a homogeneous diluted acid, while at the same time it is continuously cooled by conventional means to maintain a feed acid temperature not exceeding 135° F.

The diluted superphosphoric acid is then passed through feed pipe 32 to the ammoniator and granulator rotating drum reactor 34 where it is continuously sprayed from the end of the feed pipe 32 into the reactor 34.

Anhydrous ammonia is continuously passed from a supply source such as a tank not shown through tube 36 into an ammonia sparger 38 located in the lower portion of the reactor 34, whereby the ammonia gas is continuously and thoroughly mixed with the diluted superphosphoric acid, to obtain the ammonia polyphosphate product. The quantity of water in the diluted superphosphoric acid is such that it is sufficient to maintain the temperature of the reactor 34 bed at below 185° F. while also being vaporized and thereby removing the heat of neutralization so as to obtain a satisfactorily dry ammonia polyphosphate product. The excess product is continuously removed through discharge port 40, while at the same time excess ammonia is allowed to escape through a vent 42.

Figure 4:
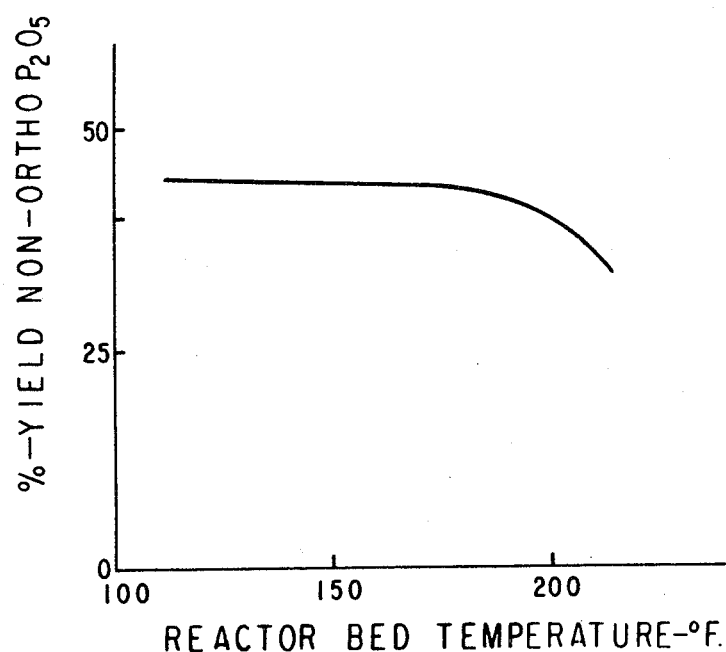
FIG. 4 is a graphical presentation of the quantitative effect of the reactor bed temperature on the production of ammonium polyphosphates.

As shown by the graph of FIG. 4 it is desirable to maintain the reactor 34 bed temperature at below 185° F. in order to prevent increasing hydrolytic degradation of the polyphosphate to the ortho-phosphate.

In order to more fully describe and illustrate the process of the present invention, but in no way intending to be limited thereon, the following examples are described.

EXAMPLE 1

Several series of test were performed utilizing furnace grade phosphoric acid, and diluting with water the concentrated superphosphoric acid as indicated just prior to ammoniation so as to maintain the time lapse below 3 minutes, without attempting to minimize or draw off the heat of dilution. The results obtained from the above series of tests are presented in the following table:

| Test | Percent $P_2O_5$ | Feed acid temp. (° F.) | Reactor bed temp. (° F.) | Prod. analysis dry basis percent $P_2O_5$ | | Percent N | Percent $H_2O$ | Non-ortho $P_2O_5$, percent of total $P_2O_5$ | Percent of orig. acid |
|---|---|---|---|---|---|---|---|---|---|
| | | | | Total | Ortho. | | | | |
| A | | (1) | | 75.6 | 41.4 | | | 45.1 | 100.0 |
| B | 55.89 | 125 | 150 | 56.3 | 32.3 | 17.2 | .3 | 42.5 | 94.5 |
| C | 55.66 | 115 | 200 | 58.0 | 35.0 | 16.6 | .1 | 39.7 | 88.0 |
| D | 54.96 | 118 | 185 | 58.0 | 34.0 | 18.6 | 2.0 | 41.4 | 92.0 |
| E | 59.84 | 120 | 215 | 57.3 | 36.3 | 18.0 | .1 | 36.6 | 81.0 |
| F | 54.09 | 125 | 210 | 54.9 | 36.2 | 19.0 | .1 | 34.1 | 76.0 |
| G | 51.21 | 115 | 175 | 57.2 | 32.8 | 16.8 | .1 | 42.7 | 95.0 |
| H | 49.24 | 135 | 120 | 55.9 | 31.2 | 20.7 | 8.0 | 44.2 | 98.0 |

1 Superphosphoric acid.

In the above series of tests, tests B, D and G are indicative of preferred condition wherein the feed acid is diluted to a concentration of from 51 percent to about 56 percent and the temperature of the bed in the reactor is maintained below 185° F. The resulting ammonium polyphosphate product is substantially dry and contains a polyphosphate yield of above 90 percent of the original acid. Where the reactor bed was maintained at above 185° F. as in tests C, E and F the yield of polyphosphates was below 90 percent of the original acid. While as in test H where the concentration of the dilute feed acid was below 51 percent the resulting product was wet, containing 8 percent water. Where the original concentrated superphosphoric acid was not diluted, a relatively good yield of non-ortho polyphosphates also resulted.

EXAMPLE 2

Superphosphoric acid which analyzed at 69.15 percent total $P_2O_5$ with 49.15 percent ortho $P_2O_5$ was diluted with ice to 54 percent concentration and ammoniated with a bed temperature below 110° F. The resulting ammonium phosphate was found to contain 26.8 percent non-ortho phosphate out of an original acid which was 29 percent non-ortho phosphate.

Having disclosed our invention and intending to cover all changes and modifications which are apparent to those skilled in the art, and which do not depart from the spirit and scope of the invention,

We claim:

1. A method for producing ammonium polyphosphates having reduced orthophosphate content which comprises:
   a. diluting superphosphoric acid containing from about 60 percent to about 85 percent by weight $P_2O_5$, by admixing water therewith to obtain phosphoric acid containing from about 49 percent to about 60 percent by weight $P_2O_5$, the temperature of dilution being in the range from about 77° F. to about 135° F., with the time period between dilution and subsequent treatment with ammonia pursuant to step (b) ranging from about 3 minutes to about 1 hour, said time period decreasing as the temperature increases so as to inhibit hydrolysis of polyphosphoric acid and to minimize formation of orthophosphoric acid,
   b. ammoniating said diluted acid with anhydrous ammonia in a reaction zone therefor, at substantially ambient pressure, said ammoniation reaction being exothermic,
   c. maintaining the temperature of said reaction at below about 210° F., said temperature being sufficient for the exothermic heat to evaporate a major amount of water present, and
   d. recovering a substantially dry ammonium polyphosphate product.

2. A method according to claim 1 in which the diluted superphosphoric acid contains from about 52 percent to about 56 percent by weight of $P_2O_5$.

3. A method according to claim 1 in which the reaction temperature is maintained at below about 185° F.

4. A method according to claim 1 in which the diluted superphosphoric acid contains from about 52 percent to about 56 percent by weight of $P_2O_5$, the reaction temperature is below about 185° F. and the ammonium polyphosphate product is substantially dry and is characterized by a polyphosphate content of above about 90 percent of the original superphosphoric acid.

* * * * *